United States Patent Office 3,260,723
Patented July 12, 1966

3,260,723
4-PHENOXY PIPERIDINES; α4-PHENOXY PIPERIDEINES
Yvon J. L'Italien, Plymouth, and Alfred Campbell, Ann Arbor, Mich., assignors to Parke, Davis & Company, Detroit, Mich., a corporation of Michigan
No Drawing. Filed Aug. 27, 1963, Ser. No. 304,960
10 Claims. (Cl. 260—294.7)

This invention relates to chemical compounds having useful pharmacological properties, to intermediates and process means for their production, and to pharmaceutical compositions embodying such chemical compounds and use thereof. More particularly, this invention relates to 4-phenoxypiperidines and acid addition salts thereof having in free base form the formula (I)
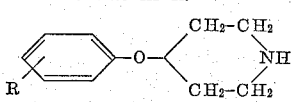

and 1-benzyl-4-phenoxy-1,2,3,6-tetrahydropyridine intermediate compounds from which the 4-phenoxypiperidines may be produced, these intermediates having the formula (II)
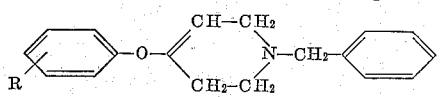

where R in the formulas represents a hydrogen or fluorine atom.

In accordance with the invention, the 1-benzyl-4-phenoxy-1,2,3,6-tetrahydropyridines of Formula II are produced by selectively reducing the corresponding 1-benzyl-4-phenoxypyridinium halides of formula (III)
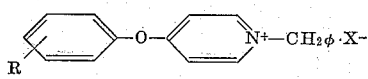

by reaction with an alkali metal borohydride in the presence of a solvent; where X⁻ is a chloride or bromide anion and R has the above-specified significance. For the reaction, the commonly available alkali metal borohydrides such as sodium, potassium and lithium borohydrides are ordinarily used, sodium borohydride being preferred for economy and ease of operation. At least one mole, and preferably an excess, of metal borohydride is employed for each mole of the pyridinium compound. For best results, an excess of 40 to 60% of borohydride is used. As a solvent, one may use water or an anhydrous or aqueous organic solvent. Among the many organic solvents which can be used are alkanols such as methanol, ethanol and isopropanol; aliphatic ethers such as diethylene glycol dimethyl ether; cyclic ethers such as dioxane; and mixtures thereof. The reaction is ordinarily run at temperatures in the range of about −10 to 30° C., and as a preferred procedure, at −10 to 0° C. initially and thereafter at higher temperature up to about 25° C. to assure completion of the reaction. While the manner of incorporation of the borohydride in the reaction mixture is not critical, a preferred practice involves adding the same (either as a solid or as a solution in solvent) as rapidly as possible at a rate consistent with a continued controlled reaction. After the addition is complete, the reaction mixture is allowed to stand, if desired with stirring, until the reaction is complete, which is usually within 6 to 24 hours. The tetrahydropyridine products can be isolated from the reaction mixture by conventional methods and purified if desired by distillation or other suitable means. For use as intermediates, however, the products are satisfactory in crude form and do not require purification.

Also according to the invention, the 4-phenoxypiperidines of Formula I are produced by reducing the corresponding 1 - benzyl - 4 - phenoxy - 1,2,3,6 - tetrahydropyridines of Formula II by means of catalytic hydrogenation, thereby to accomplish both saturation of the heterocyclic ring and debenzylation. The reduction is ordinarily run at relatively low temperature and hydrogen pressure. Reaction temperatures in the range from about 0 to 50° C. are satisfactory, the reaction preferably being carried out at room temperature, i.e., about 25° C. Hydrogen pressures of about 1 to 5 atmospheres, and preferably 3 to 4 atmospheres, may be used. An unreactive solvent is employed for the reaction, such as a lower alkanol, dioxane, tetrahydrofuran or dimethylformamide. As a catalyst, one employs a noble metal catalyst such as palladium, platinum, rhodium, oxides thereof, mixtures of such catalysts with charcoal, and similar catalysts. A preferred catalyst is palladium (5 to 20%) on charcoal in an amount of about 2 to 10% by weight as catalyst with respect to the tetrahydropyridine starting material, and for best results, about 3 to 3½% by weight of 20% palladium on charcoal. The reaction is allowed to proceed at least until the calculated quantity of hydrogen is taken up.

The phenoxypiperidine free base compounds of the invention form acid addition salts upon reaction with organic and inorganic acids. Some examples of these acid addition salts are the inorganic acids salts such as the hydrochloride, hydrobromide, hydroiodide, sulfate and phosphate, organic acid salts such as the carbonate, succinate, benzoate, acetate, citrate, malate, maleate, p-toluenesulfonate, gluconate, ascorbate, benzenesulfonate, and sulfamate, and complexes with acidic ion exchange resins. The acid addition salts are conveniently formed by mixing the free base with at least an equivalent amount of the acid in a solvent in which the salt is insoluble, particularly after chilling, thereby permitting recovery of the desired salt as a solid phase. Whereas both the free base and salt forms of the product are useful for the purposes of the invention, the salts are generally preferred in those cases where increased stability and water solubility are desirable. The invention contemplates the acid salts broadly. Those salts which are unsuited to particular uses, as for example uses where toxicity is a problem, are useful as intermediates, being readily convertible to non-toxic acid salts by means which per se are known to those in the art.

The phenoxypiperidine products of the invention possess a stimulant action on the central nervous system of animals at well tolerated doses and therefore have application when administered orally or by other suitable means as analeptic agents, e.g., as phychic energizers for combatting depression, as anoretic agents for alleviation of obesity, or as therapeutic agents for similar conditions. Standard tests in animals have shown that the products are several times more active than caffeine in stimulating motor activity.

The present invention also contemplates the provision of pharmaceutical compositions in dosage unit form for use as analeptic agents, etc., in which one or more of the above-specified phenoxypiperidine free bases and salts is constituted as an active ingredient together with carriers or diluents. In view of the oral activity of such salts, dosage unit forms for oral administration are particularly suitable. For this purpose, one or more of the salts can be incorporated with pharmaceutically-acceptable solid or liquid diluents. Solid carriers and diluents are particularly suitable and include sugars such as lactose and sucrose; cellulose derivatives such as sodium carboxymethyl cellulose, ethyl cellulose, methyl cellulose and cellulose acetate phthalate; gelatin (including hard and soft shell capsules); talc, corn starch, stearic acid and magnesium stearate. Liquid carriers and diluents suitable for use include vegetable oils such as peanut oil, cottonseed oil, sesame oil, olive oil, corn oil and oil of theobroma; polyethylene glycol; propylene glycol; glycerine; sorbitol; ethanol; and water. Suitable preservatives and flavoring agents can also be incorporated in such compositions. In the production of dosage forms such as tablets, an enteric coating or sugar coating can be applied to make the medicament more palatable. If administration by the parenteral route is desired, the composition can be formulated in ampoule form as a suspension or solution in a liquid diluent. Other therapeutic agents can also be incorporated with the compositions.

The percentage of phenoxypiperidine in the compositions (calculated as free base content) can be varied within wide limits, but for practical purposes is desirably present in a concentration of at least 5% by weight. The recommended dosage varies with the condition, weight, etc., of the individual patient but in general is such as to provide about 0.1 to 1.5 mg. of the phenoxypiperidine compound per kilogram of body weight daily. Expressed as total daily dosage for individuals over the ordinary weight range, this is about 2 to 150 mg. preferably administered in divided portions 2 to 6 times a day. The dosage is ordinarily discontinued when the condition under treatment becomes sufficiently controlled or alleviated. In the preparation of dosage unit forms such as tablets or capsules, the quantity of medicament furnished by each dosage unit form is selected such that the proper dose can be reached by administering either one or a reasonable number of the dosage units. For convenience of manufacture and ease of administration, it is preferable that such dosage forms contain at least 0.1 mg. and up to 300 mg. of phenoxypiperidine per unit.

The 1-benzyl-4-phenoxypyridinium halide starting materials described above are conveniently prepared by reacting the 4-phenoxypyridine with an equimolar quantity of benzyl halide, in the presence of an inert solvent such as acetonitrile.

The invention is illustrated by the following examples.

*Example 1*

(a) To a solution of 195 g. (0.635 mole) of 1-benzyl-4-phenoxypyridinium chloride (hemihydrate) in two liters of methanol is added portionwise, with stirring, 38 g. (1.0 mole) of sodium borohydride while maintaining the temperature at −10 to 0° C. After addition is complete, the mixture is stirred at room temperature for 20 hours, then evaporated in vacuo to remove the bulk of the methanol. The residue is stirred with 500 ml. of cold water (10° C.) and 500 ml. of ether. The ether layer is separated and dried over anhydrous potassium carbonate. The dried ether solution is evaporated and subjected to vacuum distillation. The product, obtained as a fraction boiling at 161–163° C./0.1 mm., is 1-benzyl-4-phenoxy-1,2,3,6-tetrahydropyridine.

The same product can be obtained by the above procedure by substituting an equivalent amount of 1-benzyl-4-phenoxypyridinium bromide for the corresponding chloride.

(b) To a solution of 154.2 g. (0.58 mole) of 1-benzyl-4-phenoxy-1,2,3,6-tetrahydropyridine in 400 ml. of methanol is added 5.0 g. of 20% palladium on charcoal. The mixture is shaken with hydrogen at 50 p.s.i. and 25° C. until 1.16 moles of hydrogen are taken up. The catalyst is removed by filtration and the solvent evaporated in vacuo. The residual oil is dissolved in 250 ml. of ether and the ether solution washed first with 2% aqueous sodium hydroxide, then with water, and finally is dried over anhydrous potassium carbonate. The ether solution is concentrated by evaporating the solvent and the concentrate is fractionated under reduced pressure to give the free base product, 4-phenoxypiperidine, as a fraction boiling at 107–108° C./0.15 mm.

The hydrochloride salt is prepared by treating an ethereal solution of the base with isopropanolic hydrogen chloride. The precipitated product is recrystallized from isopropanol to give colorless crystals of 4-phenoxypiperidine hydrochloride, M.P. 182–184° C. A water-soluble monohydrobromide is obtained by treating an ethereal solution of the free base with one equivalent of hydrogen bromide in isopropyl alcohol.

The starting material for (1a) above is prepared as follows: To a solution 171.2 g. (1.0 mole) of 4-phenoxypyridine in 200 ml. of acetonitrile is added 126.6 g. (1.0 mole) of benzyl chloride. The solution is allowed to stand at room temperature for 24 hours and then is heated at reflux for one hour. The solution is cooled and diluted, while stirring, with an equal volume of moist ether. The product which separates, 1-benzyl-4-phenoxypyridinium chloride (hemihydrate), is collected by filtration, washed with ether and dried; M.P. 127–128° C., after recrystallization from isopropanol-ether. By substituting 171.0 g. (1.0 mole) of benzyl bromide for the benzyl chloride in the above procedure, the product obtained is 1-benzyl-4-phenoxypyridinium bromide, M.P. 199–200° C.

*Example 2*

(a) To a solution of 68 g. (0.19 mole) of 1-benzyl-4-(4-fluorophenoxy)pyridinium bromide in 200 ml. of methanol is added slowly, with stirring, a solution of 10 g. (0.26 mole) of sodium borohydride in 50 ml. of ethanol, while maintaining the temperature at 0° C. The mixture is stirred an additional 17 hours at room temperature, then diluted with 500 ml. of water. The aqueous system is extracted with two 200 ml. portions of ether and the combined ether extract dried over anhydrous potassium carbonate. Ether is removed from the dried solution to provide the desired product, 1-benzyl-4-(4-fluorophenoxy)-1,2,3,6-tetrahydropyridine; characteristic infrared absorption peak at 5.95 microns. The product may be used for the procedure of Example 2b without further purification.

(b) To a solution of 45.3 g. (0.16 mole) of 1-benzyl-4-(4-fluorophenoxy)-1,2,3,6-tetrahydropyridine in 125 ml. of methanol is added 1.5 g. of 20% palladium on charcoal. The mixture is shaken with hydrogen at 50 p.s.i. and 25° C. until 0.32 mole is taken up. The catalyst is removed by filtration and the solvent evaporated in vacuo leaving an oil. The oil is dissolved in 100 ml. of ether, the ether solution is washed first with 2% aqueous sodium hydroxide and then with water and is finally dried over anhydrous potassium carbonate. The ether is removed by evaporation, and the residue is fractionated at reduced pressure. The product is 4-(4-fluorophenoxy)piperidine, B.P. 83–85° C./0.3 mm., $N_D^{25}$=1.5259.

The hydrochloride salt is prepared by treating an ethereal solution of the base with isopropanolic hydrogen chloride. The precipitated product is recrystallized from ethanol-ether to give colorless crystals of 4-(4-fluorophenoxy)piperidine hydrochloride, M.P. 159–161° C. A water-soluble citrate is obtained by mixing a solution of the free base in methanol with a solution of citric acid in methanol and concentrating the mixture to a small volume.

The starting material for (2a) above is prepared as follows: A mixture of 60 g. (0.54 mole) of 4-fluorophenol, 34.5 g. (0.31 mole) of 4-chloropyridine and 0.3 g. of 1-(4-pyridyl)pyridinium chloride is heated to 125° C. at which point an exothermic reaction ensues, the temperature rising to about 210° C. When the temperature begins to fall, the mixture is cooled to room temperature. About 250 ml. of 2 N hydrochloric acid and 200 ml. of ether is added with stirring. The aqueous phase is separated, washed with 200 ml. of ether and made strongly basic with 15% aqueous sodium hydroxide. The separated oil is extracted with 200 ml. of ether. The ether extract is washed with water and dried over anhydrous potassium carbonate. Evaporation of the dried ether solution and distillation of the residue under reduced pressure provides the 4-(4-fluorophenoxy)pyridine, B.P. 80–82° C./ 0.3 mm. To a solution of 37.8 g. (0.20 mole) of 4-(4-fluorophenoxy)pyridine in 150 ml. of acetonitrile is slowly added, with stirring, 34.5 g. (0.20 mole) of benzyl bromide. The solution is allowed to stand at 40° C. for 2 hours, then cooled to 25° C. and diluted with 300 ml. of ether. The precipitated product, 1-benzyl-4-(4-fluorophenoxy)pyridinium bromide, is collected, washed with ether and dried.

Example 3

(a) To a solution of 68 g. (0.19 mole) of 1-benzyl-4-(2-fluorophenoxy)pyridinium bromide in 200 ml. of methanol is added slowly, with stirring, a solution of 10 g. (0.26 mole) of sodium borohydride in 50 ml. of methanol, while maintaining the temperature at 0° C. The mixture is stirred an additional 18 hours at room temperature, then diluted with 500 ml. of water. The resulting mixture is extracted with two 200 ml. portions of ether and the combined ether extract dried over anhydrous potassium carbonate. Evaporation of the dried ether solution provides the desired product, 1-benzyl-4-(2-fluorophenoxy)-1,2,3,6-tetrahydropyridine; infrared absorption peak, 5.95 microns. This product may be used for the procedure of Example 3b without further purification.

(b) To a solution of 45.3 g. (0.16 mole) of 1-benzyl-4-(2-fluorophenoxy) - 1,2,3,6 - tetrahydropyridine in 125 ml. of methanol is added 1.5 g. of 20% palladium on charcoal. The mixture is shaken with hydrogen at 50 p.s.i. and 25° C. until 0.32 mole is taken up. The catalyst is removed by filtration and the solvent evaporated in vacuo leaving an oil. The oil is dissolved in 100 ml. of ether, the ether solution is washed with 2% aqueous sodium hydroxide and with water and is then dried over anhydrous potassium carbonate. Evaporation of the ether leaves an oil which on fractionation at reduced pressure provides the desired product, 4-(2-fluorophenoxy)piperidine, B.P. 142–147° C./10 mm.

The hydrochloride salt is prepared by treating an ethereal solution of the base with isopropanolic hydrogen chloride. The precipitated product is recrystallized from ethanol-ether to give colorless crystals of 4-(-2-fluorophenoxy)piperidine hydrochloride, M.P. 180–181° C. In like manner, the hydrobromide, sulfate sulfamate and p-toluenesulfonate salts can be prepared by treatment of an ether solution of the free base with one equivalent of the corresponding acid.

The starting material for (3a) above is prepared as follows: A mixture of 60 g. (0.54 mole) of 2-fluorophenol, 34.5 g. (0.31 mole) of 4-chloropyridine and 0.3 g. of 1-(4-pyridyl)pyridinium chloride is heated to 125° C. at which point an exothermic reaction ensues, the temperature rising to 210° C. When the temperature begins to fall, the mixture is cooled to room temperature. About 250 ml. of 2 N hydrochloric acid and 200 ml. of ether are added with stirring. The aqueous phase is separated, washed with 200 ml. of ether and made strongly basic with 15% aqueous sodium hydroxide. The separated oil is extracted with 200 ml. of ether. The ether extract is washed with water and dried over anhydrous potassium carbonate. Evaporation of the ether leaves an oil which, fractionated at reduced pressure, gives 4-(2-fluorophenoxy)pyridine, B.P. 70–71° C./0.1 mm. To a solution of 37.8 g. (0.20 mole) of 4-(2-fluorophenoxy)pyridine in 150 ml. of acetonitrile is slowly added, with stirring, 34.5 g. (0.20 mole) of benzyl bromide. The solution is allowed to stand at 40° C. for 2 hours, and is then cooled to 25° C. and diluted with 300 ml. of ether. The precipitated product, 1-benzyl-4-(2-fluorophenoxy)pyridinium bromide, is collected, washed with ether and dried; M.P. 180–181° C.

Example 4

(a) To a solution of 68 g. (0.19 mole) of 1-benzyl-4-(3-fluorophenoxy)pyridinium bromide in 600 ml. of methanol is added portionwise, with stirring, 10 g. (0.26 mole) of sodium borohydride while maintaining the temperature at −10 to ° C. After addition is complete, the mixture is stirred at room temperature for 20 hours, then evaporated in vacuo to remove the bulk of the methanol. The residue is stirred with 500 ml. of water and 500 ml. of ether. The ether layer is separated and dried over anhydrous potassium carbonate. Evaporation of the dried ether solution provides the desired product, 1-benzyl - 4 - (3 - fluorophenoxy) - 1,2,3,6 tetrahydropyridine, which has a characteristic infrared absorption peak at 5.95 microns. The product may be used for the procedure of Example 4b without further purification.

(b) To a solution of 45.3 g. (0.16 mole) of 1-benzyl-4-(3-fluorophenoxy)-1,2,3,6-tetrahydropyridine in 125 ml. of methanol is added 1.5 g. of 20% palladium on charcoal. The mixture is shaken with hydrogen at 50 p.s.i and 25° C. until 0.32 mole is taken up. The catalyst is removed by filtration and the solvent evaporated in vacuo leaving an oil. The oil is dissolved in 100 ml. of ether and the ether solution is wased with 2% aqueous sodium hydroxide, then with water and is dried over anhydrous potassium carbonate. Evaporation of the dried ether solution left an oil which, fractionated at reduced pressure, provides the desired product, 4-(3-fluorophenoxy)piperidine, B.P. 138–143° C./10 mm.

The hydrochloride salt is prepared by treating an ethereal solution of the base with isopropanolic hydrogen chloride. The precipitated product is recrystallized from ethanol-ether to give colorless crystals of 4-(3-fluorophenoxy)piperidine hydrochloride, M.P. 195–196° C.

The starting material for (4a) above is prepared as follows: A mixture of 60 g. (0.54 mole) of 3-fluorophenol, 34.5 g. (0.31 mole) of 4-chloropyridine and 0.3 g. of 1-(4-pyridyl)pyridinium chloride is heated to 120 C. at which point an exothermic reaction ensues, the temperature rising above 200° C. When the temperature begins to fall, the mixture is cooled to room temperature. About 250 ml. of 2 N hydrochloric acid and 200 ml. of ether are added with stirring. The aqueous phase is separated, washed with 200 ml. of ether and made strongly basic with 15% aqueous sodium hydroxide. The separated oil is extracted with 200 ml. of ether. The ether extract is washed with water and dried over anhydrous potassium carbonate. Evaporation of the dried ether solution leaves an oil which when fractionated at reduced pressure provides 4-(3-fluorophenoxy)-pyridine, B.P. 136–138° C./10 mm. To a solution of 37.8 g. (0.20 mole) of 4-(3-fluorophenoxy)pyridine in 150 ml. of acetonitrile is slowly added, with stirring, 34.5 g. (0.20 mole) of benzyl bromide. The solution is allowed to stand at 40° C. for 2 hours, then cooled to 25° C. and diluted with 300 ml. of ether. The precipitated product, 1-benzyl-4-(3-fluorophenoxy)pyridinium bromide, is collected, washed with ether and dried; M.P. 142–144° C.

Example 5

FORMULA FOR TEN-MILLIGRAM TABLET

| | |
|---|---|
| 4-phenoxypiperidine hydrochloride, g. | 10 |
| Sugar with 3% starch, powdered, g. | 25 |
| Milk sugar, U.S.P. powder, g. | 50 |
| Corn starch, sifted, g. | 10 |
| Acacia solution, dry weight, g. | 1.2 |
| Talc, sifted, g. | 4 |
| Magnesium stearate, U.S.P., mg. | 500 |

(1) Blend the phenoxypiperidine hydrochloride, starch sugar, milk sugar and corn starch.
(2) Granulate the blend of (1) with the acacia solution. Finish granulating with distilled water if necessary.
(3) Screen the wet granulation of (2) through a No. 10 stainless steel screen and dry overnight in an air drier at 120–130° F.

(4) Reduce the dried granulation through a No. 20 mesh screen and blend in the talc and magnesium stearate.

(5) Compress the blend of (4) on a tableting machine using ¼" concave punches. Yield, approximately 1000 tablets each containing about 10 mg. of 4-phenoxypiperidine hydrochloride. The formula is also applicable to other salts of 4-phenoxypiperidine or to salts in general of 4-(2-, 3- or 4-fluoro)phenoxypiperidine.

*Example 6*

FORMULA FOR TEN-MILLIGRAM CAPSULE

|  | G. |
|---|---|
| 4-(4-fluorophenoxy)piperidine hydrochloride | 10 |
| Milk sugar, U.S.P. powder | 170 |

(1) Pass the 4-(4-fluorophenoxy)piperidine hydrochloride and milk sugar through a No. 30 mesh screen and blend the resulting powder thoroughly.

(2) Fill the powder blend into No. 4 hard-shell gelatin capsules, using a capsule filling machine. Yield, about 1000 capsules suitable for oral administration, each containing approximately 10 mg. of 4-(4-fluorophenoxy)piperidine hydrochoride.

*Example 7*

FORMULA FOR AQUEOUS FLAVORED SYRUP—100 CC.

| 4-phenoxypiperidine hydrochloride, g. | 0.200 |
|---|---|
| Sugar, medium granular cane, g. | 20 |
| Sodium citrate, U.S.P., g. | 0.25 |
| Sodium benzoate, U.S.P., g. | 0.5 |
| Citric acid anhydrous, U.S.P., g. | 0.04 |
| Glycerin, U.S.P., cc. | 5 |
| Raspberry imitation flavor, cc. | 0.5 |
| Coloring agent (FD & C Red No. 4), mg. | 0.003 |
| Distilled water, q.s. ad. 100 cc. | |

(1) Dissolve the 4-phenoxypiperidine hydrochloride in 60 cc. of water, with stirring. Add the sodium benzoate, sodium citrate, citric acid, sugar, glycerin, coloring and flavor.

(2) Adjust the volume to 100 cc. with distilled water and mix thoroughly. Each 5 cc. of the resulting syrup mixture contains about 10 mg. of 4-phenoxypiperidine hydrochloride.

What is claimed is:

1. A compound of the group consisting of 4-phenoxypiperidines of formula

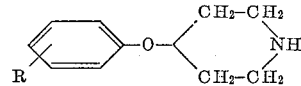

4-phenoxy-1,2,3,6-tetrahydropyridines of formula

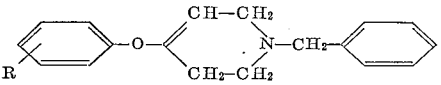

and acid addition salts of said 4-phenoxypiperidines; where R is a member of the group consisting of hydrogen and fluorine atoms.

2. 4-phenoxypiperidine.
3. 4-phenoxypiperidine hydrochloride.
4. 4-(2-fluorophenoxy)piperidine hydrochloride.
5. 4-(3-fluorophenoxy)piperidine hydrochloride.
6. 4-(4-fluorophenoxy)piperidine hydrochloride.
7. 1-benzyl-4-phenoxy-1,2,3,6-tetrahydropyridine.
8. 1 - benzyl - 4-(2-fluorophenoxy)-1,2,3,6-tetrahydropyridine.
9. 1 - benzyl - 4-(3-fluorophenoxy)-1,2,3,6-tetrahydropyridine.
10. 1 - benzyl - 4-(4-fluorophenoxy)-1,2,3,6-tetrahydropyridine.

References Cited by the Examiner

UNITED STATES PATENTS

| 2,831,862 | 4/1958 | Biel | 260—294.7 |
| 2,886,570 | 5/1959 | Palopoli et al. | 260—297 |
| 2,937,118 | 5/1960 | Haxthausen et al. | 167—65 |
| 3,063,902 | 11/1962 | Gray et al. | 167—65 |
| 3,075,989 | 1/1693 | Godin et al. | 260—297 |
| 3,091,616 | 5/1963 | Petrow et al. | 260—297 |
| 3,093,650 | 5/1963 | Fry et al. | 260—297 |

FOREIGN PATENTS

| 1,343,290 | 10/1963 | France. |
| 1,398,193 | 3/1965 | France. |

OTHER REFERENCES

Koenigs et al., Chem. Abst., vol. 9, page 2254 (1915).

WALTER A. MODANCE, *Primary Examiner.*

NICHOLAS S. RIZZO, *Examiner.*

R. L. PRICE, A. D. SPEVACK, *Assistant Examiners.*